(12) United States Patent
Yuan et al.

(10) Patent No.: US 9,299,377 B2
(45) Date of Patent: Mar. 29, 2016

(54) STORAGE MEDIUM FOR STORING DATA AND SERVO INFORMATION

(71) Applicant: Marvell International LTD., Hamilton (BM)

(72) Inventors: Zhimin Yuan, Singapore (SG); Bo Liu, Singapore (SG); Jiangzhong Shi, Singapore (SG); Weidong Zhou, Singapore (SG)

(73) Assignee: Marvell International LTD., Hamilton (BM)

(*) Notice: Subject to any disclaimer, the term of this patent is extended or adjusted under 35 U.S.C. 154(b) by 0 days.

(21) Appl. No.: 14/684,731

(22) Filed: Apr. 13, 2015

(65) Prior Publication Data

US 2015/0213824 A1 Jul. 30, 2015

Related U.S. Application Data

(60) Continuation of application No. 14/494,499, filed on Sep. 23, 2014, now Pat. No. 9,007,713, which is a division of application No. 13/684,026, filed on Nov. 21, 2012, now Pat. No. 8,867,171.

(30) Foreign Application Priority Data

Nov. 21, 2011 (SG) .................................. 201108621

(51) Int. Cl.
*G11B 5/82* (2006.01)
*G11B 3/70* (2006.01)
(Continued)

(52) U.S. Cl.
CPC .. *G11B 5/66* (2013.01); *G11B 5/02* (2013.01); *G11B 5/09* (2013.01); *G11B 5/29* (2013.01); *G11B 5/4813* (2013.01); *G11B 5/59638* (2013.01); *G11B 5/62* (2013.01); *G11B 5/7325* (2013.01); *G11B 5/82* (2013.01); *G11B 5/84* (2013.01); *G11B 5/8408* (2013.01); *G11B 2005/0021* (2013.01)

(58) Field of Classification Search
CPC ........... G11B 2005/0021; G11B 5/314; G11B 11/0584; G11B 11/0554; G11B 11/058; G11B 5/82; G11B 5/743; G11B 5/84; G11B 11/105824; G11B 5/6088
USPC .......... 369/13.33, 13.13, 13.32, 13.17, 13.56, 369/288; 360/135; 428/831, 819.1, 846, 428/829
See application file for complete search history.

(56) References Cited

U.S. PATENT DOCUMENTS 6,709,801 B2 3/2004 Miyamoto et al.
6,954,941 B2 10/2005 Miyamoto et al.
(Continued)

*Primary Examiner* — Nabil Hindi

(57) ABSTRACT

A storage medium including a servo layer, a data recording layer, a heat sink layer, and a diamond-like carbon layer with a lubricant covering. The servo layer is configured to store servo information on the storage medium. The servo information is used to position a read/write head over the storage medium during a read/write operation performed by the read/write head on the storage medium. The data recording layer is configured to store data on the storage medium during the read/write operation performed by the read/write head on the storage medium. The heat sink layer is disposed between the servo layer and the data recording layer. The diamond-like carbon layer with the lubricant covering is disposed above the data recording layer.

13 Claims, 10 Drawing Sheets

(51) Int. Cl.
   *G11B 5/66*    (2006.01)
   *G11B 5/02*    (2006.01)
   *G11B 5/62*    (2006.01)
   *G11B 5/84*    (2006.01)
   *G11B 5/29*    (2006.01)
   *G11B 5/596*   (2006.01)
   *G11B 5/73*    (2006.01)
   *G11B 5/09*    (2006.01)
   *G11B 5/48*    (2006.01)
   *G11B 5/00*    (2006.01)

(56) References Cited

U.S. PATENT DOCUMENTS

| 2004/0042381 | A1  | 3/2004  | Miyamoto et al. |
| 2007/0243417 | A1* | 10/2007 | Murakami ........... G11B 5/3967 428/818 |
| 2008/0187861 | A1  | 8/2008  | Meinders |
| 2011/0020669 | A1* | 1/2011  | Sayama ................ G11B 5/656 428/831 |

* cited by examiner

STORAGE MEDIUM FOR STORING DATA AND SERVO INFORMATION

CROSS-REFERENCE TO RELATED APPLICATIONS

This patent application is a continuation application of U.S. patent application Ser. No. 14/494,499 (now U.S. Pat. No. 9,007,713), filed Sep. 23, 2014, entitled "MEDIUM, METHOD OF FABRICATING A MEDIUM, RECORDING SYSTEM AND METHOD OF CONTROLLING A RECORDING SYSTEM," which is a divisional application of U.S. patent application Ser. No. 13/684,026 (now U.S. Pat. No. 8,867,171), filed Nov. 21, 2012, entitled "MEDIUM, METHOD OF FABRICATING A MEDIUM, RECORDING SYSTEM AND METHOD OF CONTROLLING A RECORDING SYSTEM," which claims the benefit of priority of Singapore Patent Application No. 201108621-2, filed 21 Nov. 2011. The entire disclosures of the applications referenced above are incorporated herein by reference.

FIELD

Various embodiments relate generally to a medium, a method of fabricating a medium, a recording system, and a method of controlling a recording system.

BACKGROUND

A conventional magnetic recording medium has all the servo information buried in a magnetic data layer. The servo information cannot be overwritten during a writing process of recording data on the magnetic data layer.

Another conventional medium includes a magnetic data layer, and a physically separate magnetic layer as a dedicated servo layer for storing the servo information. However, a writing field from a recording/writing head may write the magnetic data layer only but not affect the dedicated servo layer, in other words, the servo information in the servo layer cannot be overwritten by the writing field from data recording head.

SUMMARY

According to one embodiment, a medium is provided. The medium includes a servo layer, a data recording layer, and a heat sink layer disposed between the servo layer and the recording layer.

According to another embodiment, a method of fabricating a medium is provided. The method includes disposing a servo layer above a substrate, disposing a heat sink layer above the servo layer, and disposing a data recording layer above the heat sink layer.

According to another embodiment, a recording system is provided. The recording system includes a first recording head, a second recording head, and a medium including a data recording layer and a servo layer, wherein the data recording layer is arranged between the recording head and the servo layer; and an external energy source. The first recording head and the external energy source may be configured to respectively provide a first magnetic field of a first magnetic field strength and external energy for writing on the data recording layer. The second recording head is configured to provide a second magnetic field of a second magnetic field strength for writing on the servo layer. The first magnetic field strength may be weaker than the second magnetic field strength.

According to another embodiment, a method of controlling a recording system is provided. The method includes controlling a first recording head and a second recording head, controlling an external energy source, controlling the recording head and the external energy source to respectively provide a first magnetic field of a first magnetic field strength and external energy for writing on a data recording layer of a medium, and controlling the second recording head to provide a second magnetic field of a second magnetic field strength for writing on a servo layer of the medium. The first magnetic field strength may be weaker than the second magnetic field strength.

BRIEF DESCRIPTION OF DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Embodiments of a medium, a method of fabricating a medium, a recording system, and a method of controlling a recording system will be described in detail below with reference to the accompanying figures. It will be appreciated that the embodiments described below can be modified in various aspects without changing the essence of the invention.

In the context of various embodiments, in a dedicated servo implementation, a servo layer is dedicated to store the position data referred to as servo data or servo signal, The servo layer may be a buried layer arranged beneath a data recording layer and may have a perpendicular or a longitudinal magnetization orientation for providing magnetic information for determining the location of the recording head in relation to the storage medium. The servo information is provided on the servo layer distinct from the data recording layer so as to allow continuously available servo readback to enable continual position feedback thereby providing continual location detection (notes the track address signals are in the data recording layer at a much reduced number of wedges, e.g. around 100 wedges). This may provide higher positioning accuracy through continual location determination, while also removing the servo positioning signals from the recording layer, thereby increasing surface utilization of the storage space in the recording layer and further increasing the data recording density by increasing the track positioning accuracy.

In the context of various embodiments, the servo layer may include a plurality of concentric tracks for holding the servo information. Each servo track may be assigned or associated with a single frequency signal, Adjacent servo tracks may be assigned different frequencies, Repeated servo tracks may be assigned alternate frequencies. In the context of various embodiments, adjacent servo tracks mean tracks that are arranged side-by-side. In various embodiments, two adjacent servo tracks share a common boundary.

In the context of various embodiments, the term "head" may include a magnetic head. In addition, the "head" may refer to the read/write head for reading/writing information or data from/to a storage medium, The head includes a reader and a writer. The head is positioned over a storage medium and the reader may read signal or information from the storage medium and the writer may write information to the storage medium.

Figure 1A:
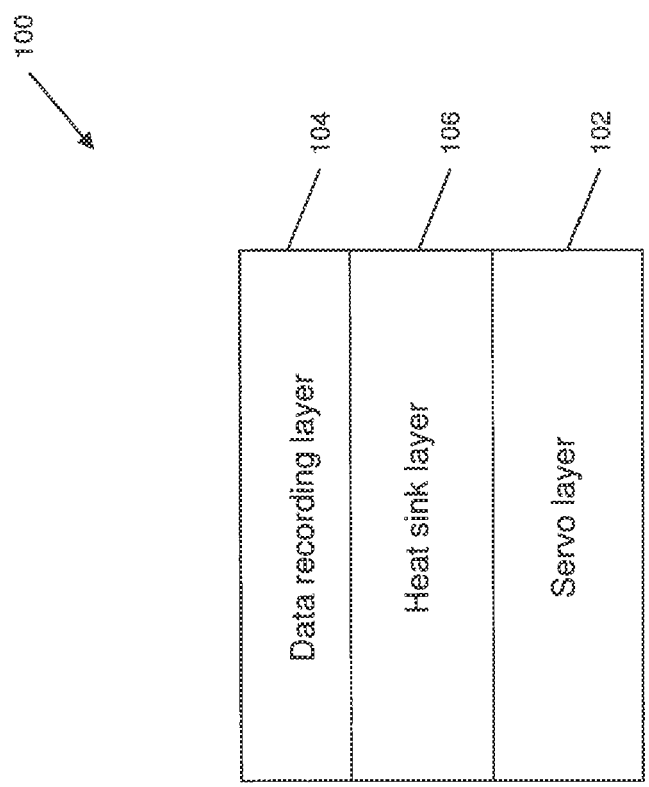
FIG. 1a shows a schematic diagram of a medium according to one embodiment.

FIG. 1a shows a schematic diagram of a medium 100. The medium includes a servo layer 102, a data recording layer 104, and a heat sink layer 106 disposed between the servo layer 102 and the data recording layer 104. The heat sink layer 106 can reduce a temperature of the servo layer 102 during data writing on the data recording layer 104.

Figure 1B:
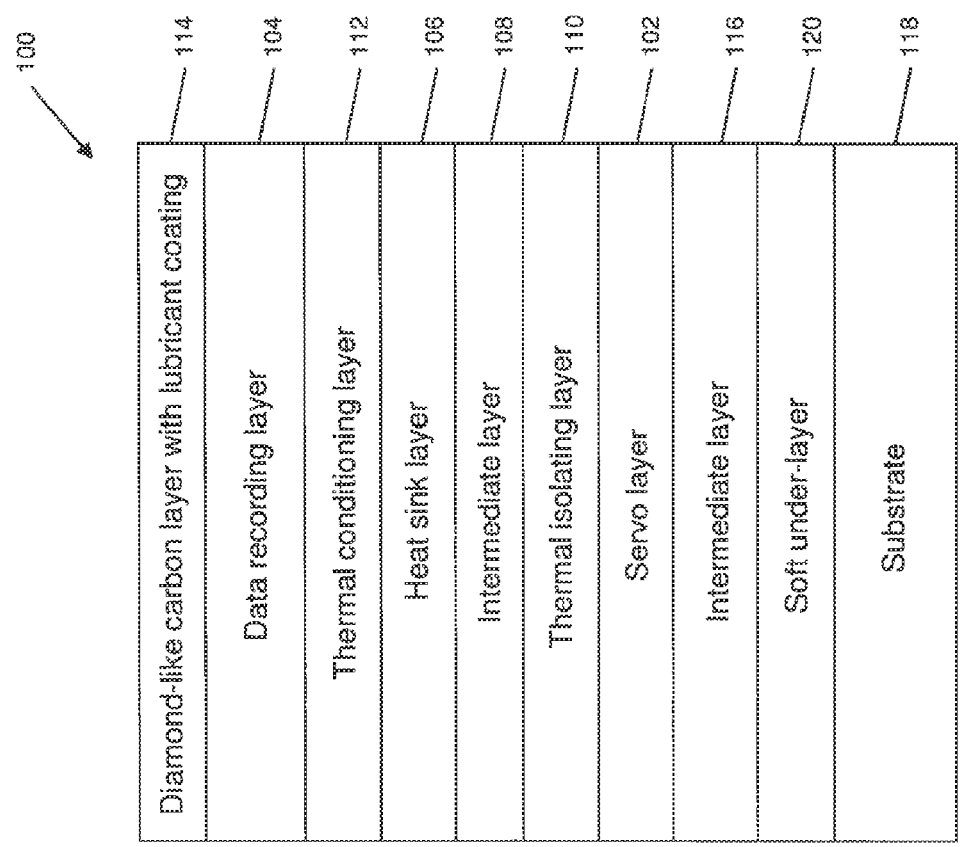
FIG. 1b shows a schematic diagram of a medium according to one embodiment.

In one embodiment, as shown in FIG. 1b, the medium 100 further includes a thermal isolating layer 110, an intermediate layer 108 and a thermal conditioning layer 112. The thermal isolating layer 110 is disposed above the servo layer 102. The intermediate layer 108, the heat sink layer 106 and the thermal conditioning layer 112 are disposed between the data recording layer 114 and the thermal isolating layer 110.

In one embodiment, the intermediate layer 108 is disposed above the thermal isolating layer 110, the heat sink layer 106 is disposed above the intermediate layer 108, and the thermal conditioning layer 112 is disposed above the heat sink layer 106.

In another embodiment, the heat sink layer 106 is disposed above the thermal isolating layer 110, the intermediate layer 108 is disposed above the heat sink layer 106, and the thermal conditioning layer 112 is disposed above the intermediate layer 108.

In yet another embodiment, the heat sink layer 106 is disposed above the thermal isolating layer 110, the thermal conditioning layer 112 is disposed above the heat sink layer 106, and the intermediate layer 108 is disposed above the thermal conditioning layer 112.

In one embodiment, the thermal conditioning layer 112 may be an intermediate layer having a thermal conditioning function.

In one embodiment, the intermediate layer 108 can be used for magnetic property control of the data recording layer 104. The intermediate layer 108 can be used for assisted energy conditioning if an energy assisted magnetic recording scheme is used for writing on the medium 100.

The medium 100 may further include a diamond-like carbon (DLC) layer with lubricant covering 114 disposed above the data recording layer 104. The medium 100 may further include a further intermediate layer 1.16 and a substrate 118. The servo layer 102 may be disposed above the further intermediate layer 116. The further intermediate layer 116 may be disposed above the substrate 118. The substrate 118 may include but is not limited to glass.

The medium 100 may include a magnetic soft under-layer (SUL) 120 disposed between the substrate 118 and the further intermediate layer 116. The soft under-layer (SUL) 120 can help to enhance the writing ability of the servo layer 102. If a recording/writing head has writing ability for saturation writing of the servo layer 102, a soft under-layer (SUL) 120 may not be required in the medium 100.

Each of the thermal isolating layer 110, the intermediate layer 108, the heat sink layer 106, the thermal conditioning layer 112, the further intermediate layer 116, and the soft under-layer (SUL) 120 may include one or more layers of materials, The thermal isolating layer 110 may include but is not limited to silicon dioxide (SRI), titanium dioxide ($TiO_2$) and magnesium oxide (MgO). The intermediate layer 108 may include but is not limited to magnesium oxide (MgO) and titanium nitride (TiN). The heat sink layer 106 may include but is not limited to silver (Ag) and copper (Cu). The thermal conditioning layer 112 may include but is not limited to magnesium oxide (MgO) and titanium nitride (TiN). The further intermediate layer 116 may include but is not limited to ruthenium. (Ru) and ruthenium cobalt (RuCo). The soft under-layer (SUL) 120 may include but is not limited to cobalt-iron (CoFe) and a stack arrangement of cobalt-iron-zirconium-boron (CoFeZrB)/ruthenium (Ru)/cobalt-iron-zirconium-boron (CoFeZrB).

Figure 8:
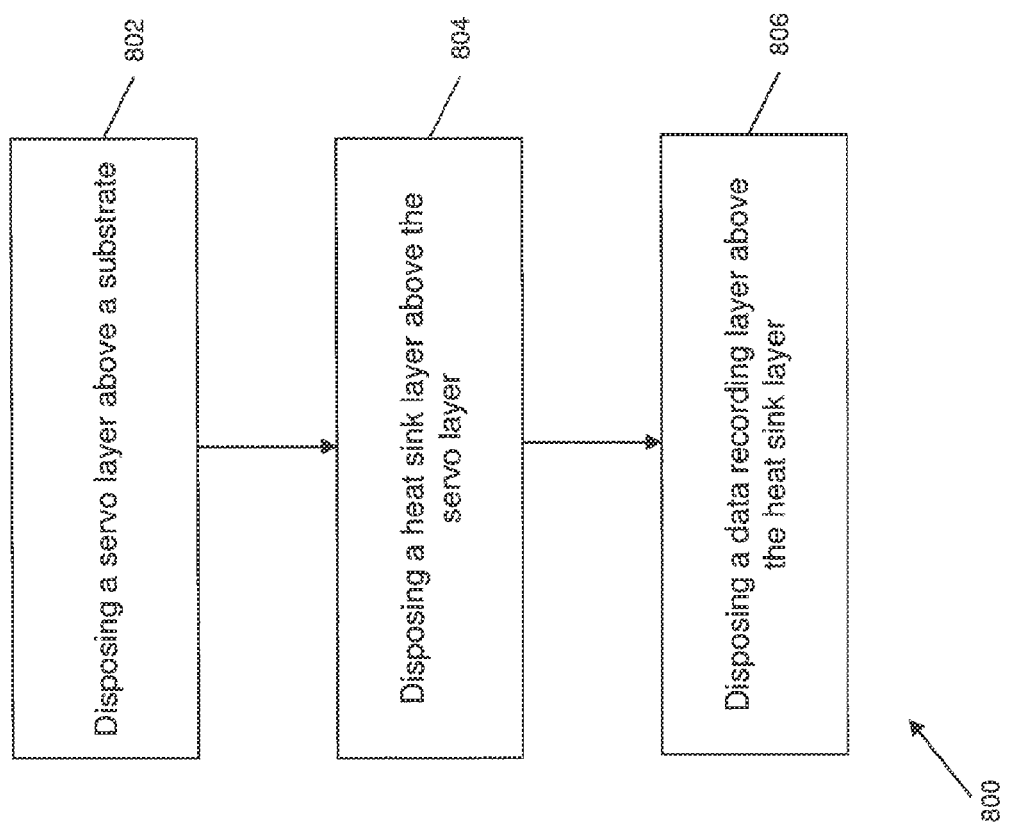
FIG. 8 shows a flowchart of a method of fabricating a medium according to one embodiment.

FIG. 8 shows a flowchart 800 of a method of fabricating a medium. At 802, a servo layer is disposed above a substrate. At 804, a heat sink layer is disposed above the servo layer. At 806, a data recording layer is disposed above the heat sink layer.

In one embodiment, a thermal isolating layer may be disposed above the servo layer before the heat sink layer is disposed above the servo layer. The heat sink layer may be disposed above the thermal isolating layer. An intermediate layer and a thermal conditioning layer may be disposed above the thermal isolating layer before the data recording layer is disposed above the heat sink layer.

In one embodiment, the intermediate layer may be disposed above the thermal isolating layer, the heat sink layer may be disposed above the intermediate layer, and the thermal conditioning layer may be disposed above heat sink layer. The data recording layer may be disposed above the thermal conditioning layer.

In another embodiment, the heat sink layer may be disposed above the thermal isolating layer, the intermediate layer may be disposed above the heat sink layer, and the thermal conditioning layer may be disposed above the intermediate layer. The data recording layer may be disposed above the thermal conditioning layer.

In yet another embodiment, the heat sink layer may be disposed above the thermal isolating layer, the thermal conditioning layer may be disposed above the heat sink layer, and the intermediate layer may be disposed above the thermal conditioning layer. The data recording layer may be disposed above the intermediate layer.

In one embodiment, a diamond-like carbon (DLC) layer with lubricant covering may be disposed above the data recording layer. A further intermediate layer may be disposed above the substrate before the servo layer is disposed above the substrate. The servo layer may be disposed above the further intermediate layer.

In one embodiment, a magnetic soft under-layer (SUL) may be disposed above the substrate before the further intermediate layer is disposed above the substrate. The further intermediate layer may be disposed above the magnetic soft under-layer (SUL).

Figure 2:
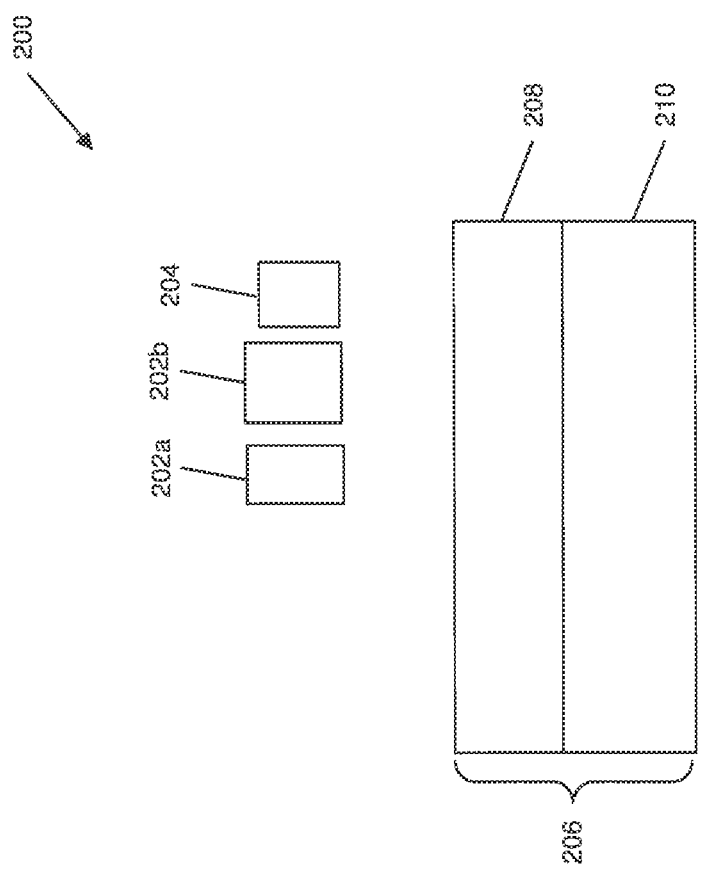
FIG. 2 shows a schematic diagram of a recording system according to one embodiment.

FIG. 2 shows a schematic diagram of a recording system 200. The recording system 200 includes a first recording head 202a, a second recording head 202b and an external energy source 204. In one embodiment, the external energy source 204 may include but is not limited to laser, infrared heating, electrical Joule heating and injection of hot air.

The recording system 200 also includes a medium 206 having a data recording layer 208 and a servo layer 210. The data recording layer 208 is arranged between the recording head 202 and the servo layer 210. In other words; the distance between the servo layer 210 and the recording head 202 is larger than the distance between the data recording layer 208 and the recording head 202.

In one embodiment, the medium 206 employs dedicated servo whereby a magnetic layer separate from the data recording layer 208 is used as the servo layer 210, which is dedicated to hold only servo information. No data is embedded on the servo layer 210. In one embodiment, the servo layer 210 and data recording layer 208 may be put on the same side and they may be read and/or processed together; this may also be referred to as dedicated servo.

In one embodiment, the second recording head 202b has a larger dimension than the first recording head 202a. The second recording head 202b may have a larger width than the first recording head 202a. The second recording head 202b may have a larger length than the first recording head 202a. The second recording head 202b may have a width ranging from about 300 nm to about 1500 nm. The second recording head 202b may have a length ranging from about 200 nm to about 1500 nm.

The first recording head 202a and the second recording head 202b may be configured to write on the medium 206. The first recording head 202a and the external energy source 204 are configured to respectively provide a first magnetic field of a first magnetic field strength and external energy for writing on the data recording layer 208. The second recording head 202b is configured to provide a second magnetic field of a second magnetic field strength for writing on the servo layer 210. In other words, the first recording head 202a provides the first magnetic field of the first magnetic field strength and the external energy source 204 provides the external additional energy to write data on the data recording layer 208, The second recording head 202b (e.g. wide magnetic head) provides the second magnetic field of the second magnetic field strength to write servo information on the servo layer 210.

The first recording head 202a may produce a writing field and the external energy source 204 may provide energy on the medium 206. The writing field produced by the recording head 202 and the energy provided by the external energy source 204 may form an effective writing field for writing on the medium 206. Data may be written or overwritten on the data recording layer 208 by the effective writing field.

If the effective writing field is the second magnetic field of the second magnetic field strength provided by the second recording head 202b, servo information may be written on the servo layer 210.

In one embodiment, the first magnetic field strength is weaker than the second magnetic field strength.

The writing field produced by the first recording head 202a and the energy provided by the external energy source 204 may have weaker strength than the second magnetic field strength. Further, the strength of both the writing field produced by the first recording head 202a and the energy provided by the external energy source 204 may have large spatial decay. Thus, the first magnetic field of the first magnetic field strength may not have sufficient magnetic field strength to cause servo information to be written on the servo layer 210. The first magnetic field strength may be weaker than a nucleation field strength of the servo layer 210.

Therefore, the first magnetic field of the first magnetic field strength may not affect the magnetic signal in the servo layer 210. The magnetic signals in the servo layer 210 can maintain the magnetic integrity after multiple times of data writing on the data recording layer 208. This can allow the servo layer 210 to be arranged at a larger distance from the recording head 202 as compared to the data recording layer 208.

Further, both the feature sizes of the writing field produced by the first recording head 202a and the energy provided by the external energy source 204 can be confined to a small size for high density recording to write smaller bits. Therefore, energy assisted magnetic recording can increase areal recording density. Energy provided by the external energy source 204 can be generated and dissipated in a rate such that it has less impact to the adjacent recorded bits.

Due to the large spatial decay, the energy provided by the external energy source 204 may not penetrate beyond the data recording layer 208, in particular, not beyond the heat sink layer 106 if the medium 206 has a similar structure as the medium 100 in FIG. 1b. A temperature of any layer(s) arranged below the data recording layer 208 can be prevented from exceeding a threshold temperature. Consequently, quality recording can be achieved.

The recording system 200 may employ an energy assisted magnetic recording scheme for writing on the data recording layer 208 and the servo layer 210. When the energy assisted magnetic recording scheme is used magnetic anisotropy of the servo layer 210 can be smaller than magnetic anisotropy of the data recording layer 208.

Figure 3:
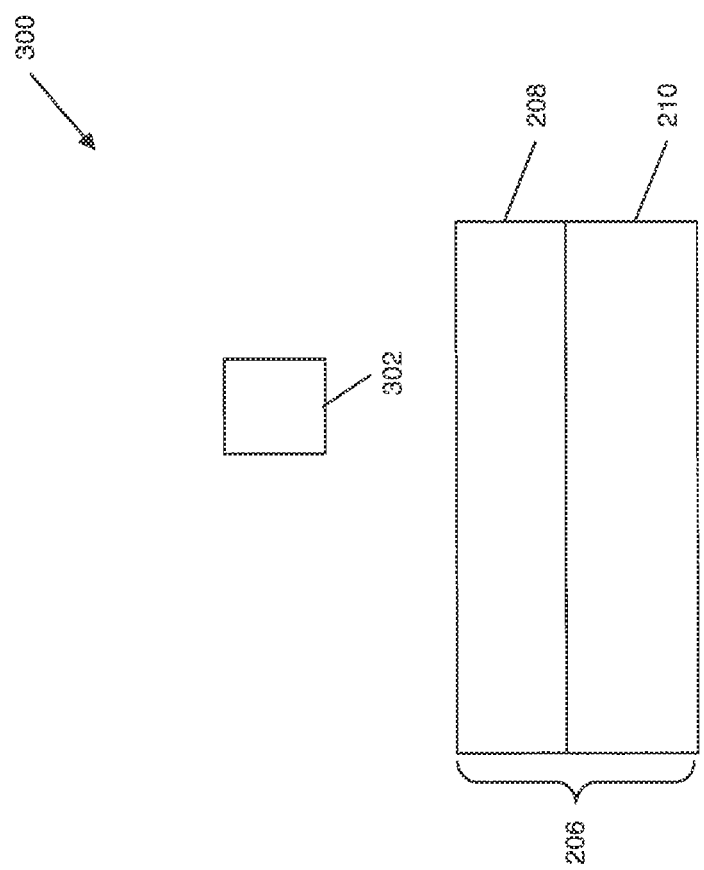
FIG. 3 shows a schematic diagram of a recording system according to one embodiment.

FIG. 3 shows a schematic diagram of a recording system 300 for servo writing process. In the recording system 300, a wide head 302 is used to produce the second magnetic field of a second field strength for writing the servo layer signals. The recording head 302 may be the second recording head 202b of FIG. 2.

In one embodiment, the recording head 302 has a larger dimension than the first recording head 202a of FIG. 2. The recording head 302 may have a larger width than the first recording head 202a of FIG. 2. The recording head 302 may have a larger length than the first recording head 202a of FIG. 2. The recording head 302 may have a width ranging from about 300 nm to about 1500 nm. The recording head 302 may have a length ranging from about 200 nm to about 1500 nm.

The recording head 302 is configured to write servo information on the servo layer 210. In one embodiment, the recording head 302 is configured to write servo information on the servo layer 210 using an energy assisted magnetic recording scheme. The energy assisted magnetic recording scheme may include heat assisted magnetic recording scheme. The recording head 302 and an external energy source (e.g. the external energy source 204 of FIG. 2) may respectively provide a second magnetic field of a second magnetic field strength and external energy for writing on the servo layer 210. In other words, the recording head 302 may provide the second magnetic field of the second magnetic field strength and the external energy source may provide the additional energy to write servo information on the servo layer 210. The recording head 302 may produce a writing field and the external energy source 204 may provide energy on the medium 206. The writing field produced by the recording head 302 and the energy provided by the external energy source 204 may form an effective writing field for writing servo information on the servo layer 210.

The recording system 300 may employ the energy assisted magnetic recording scheme for writing on the servo layer 210. When the energy assisted magnetic recording scheme is used, magnetic anisotropy of the servo layer 210 can be smaller than magnetic anisotropy of the data recording layer 208.

In one embodiment, the recording head 302 is configured to write servo information on the servo layer 210 using a shingled writing scheme. The recording head 302 may provide the second magnetic field of the second magnetic field strength for writing on the servo layer 210. The external energy source 204 may not be used for the, shingled writing scheme. The recording head 302 can produce a magnetic writing field having a magnetic field strength (e.g. the second magnetic field of the second magnetic field strength) sufficient for servo layer saturation writing.

Figure 4:
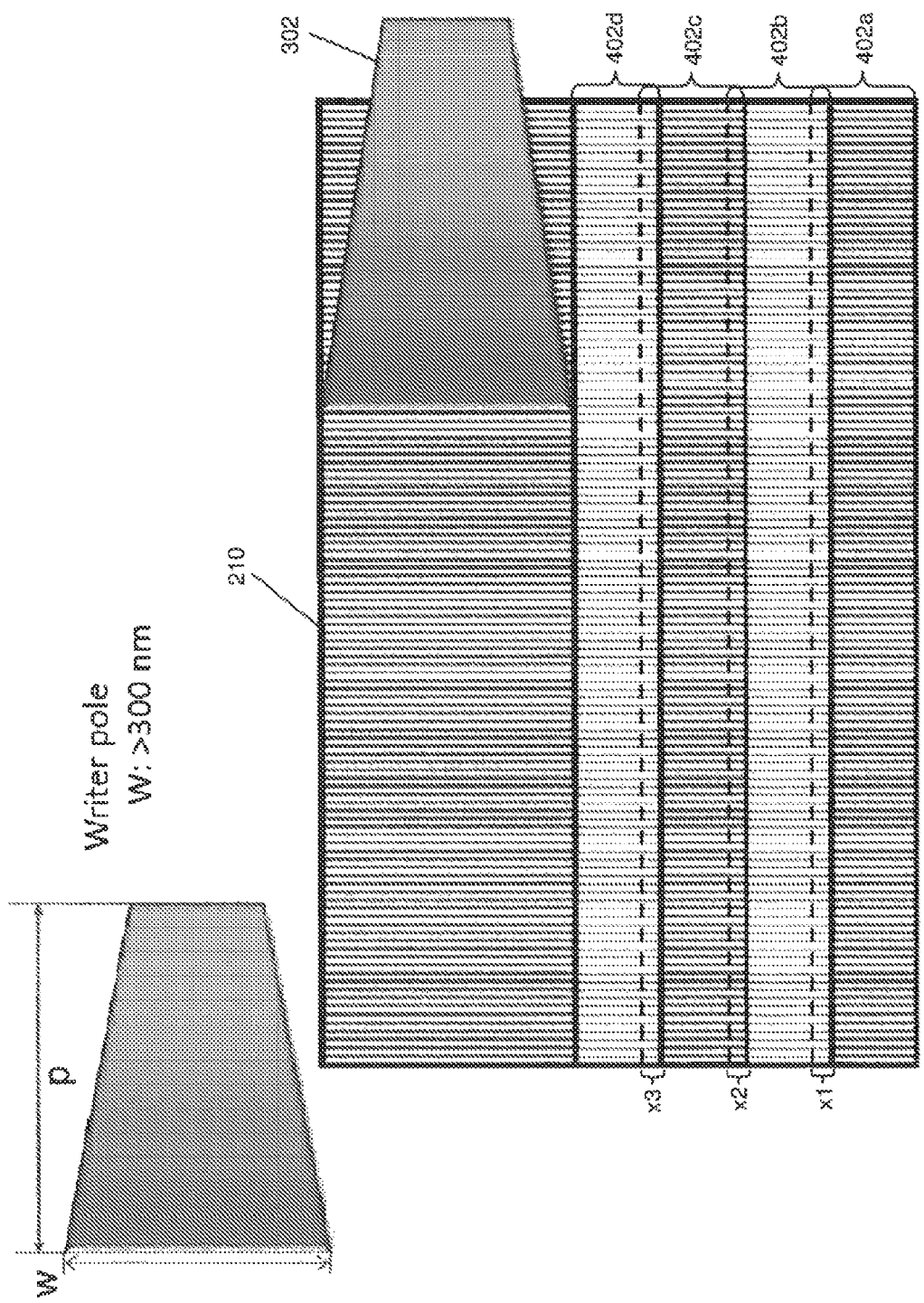
FIG. 4 illustrates a shingled writing scheme carried out by a recording head for writing on a servo layer according to one embodiment.

FIG. 4 illustrates the shingled writing scheme. By using the shingled writing scheme, the servo tracks 402a, 402b, 402c, 402d written by the recording head 302 on the servo layer 210 are overlapped in a sequential manner. A portion x1 of the first servo track 402a is overlapped by the second servo track 402b, a portion x2 of the second servo track 4021:a is overlapped by the third servo track 402c, and a portion x3 of the third servo track 402c is overlapped by the fourth servo track 402d.

Figure 5:
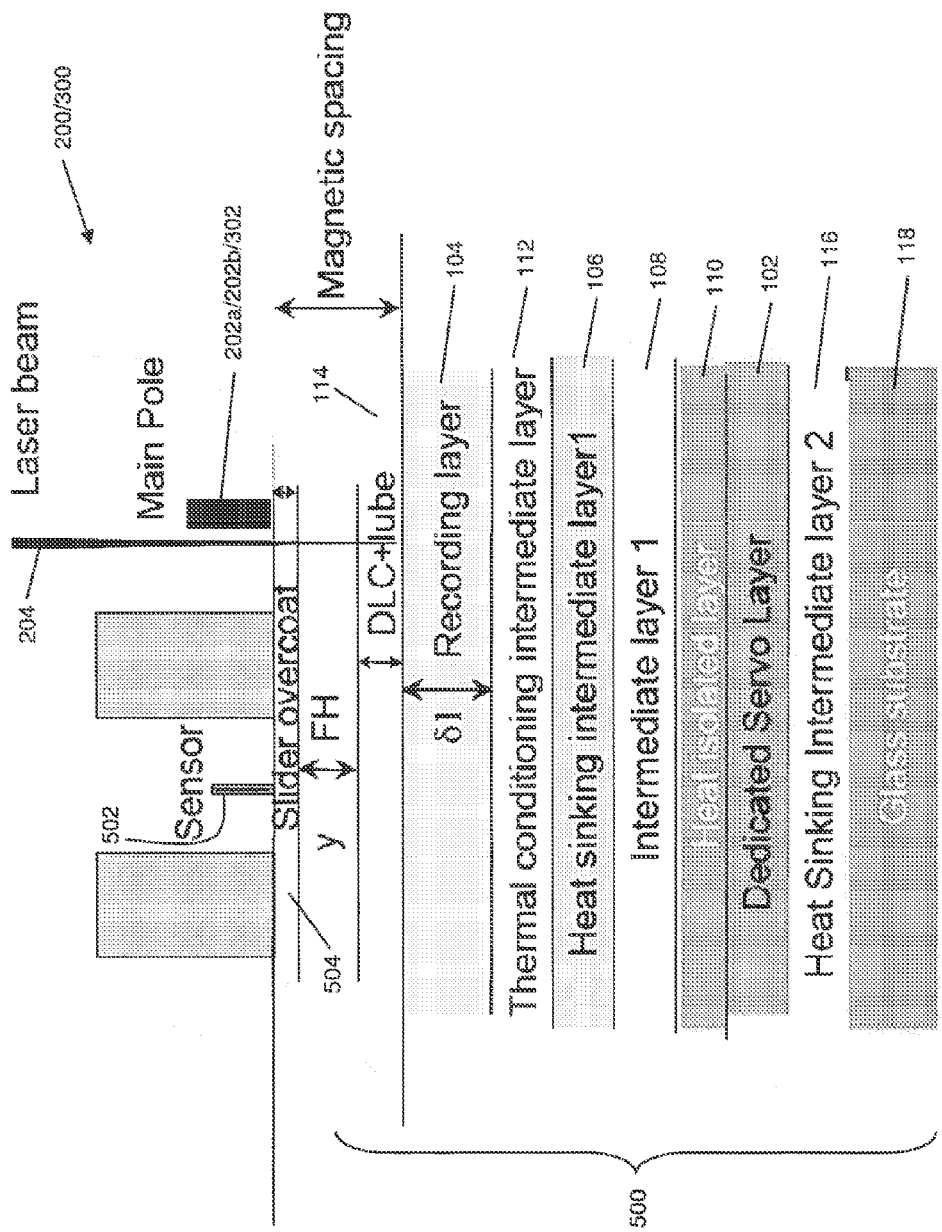
FIG. 5 shows a schematic diagram of a recording system according to one embodiment.

This can overcome a possible problem of the track width resulting from the recording head 302 being larger than the desired track width of the servo tracks 402a, 402b, 402c, 402d. Further, the resulting track width obtained from the recording head 302 using the shingled writing scheme is narrower than that obtained from the recording head 302 without using the shingled writing scheme, FIG. 5 shows a schematic diagram of the recording system 200/300 used for a medium 500. The medium 500 may have a similar arrangement/configuration as the medium 100 of FIG. 1b, except that the medium 500 excludes a soft under-layer (SUL). In one embodiment, the external energy source 204 of the recording system 200/300 is laser. The recording system 200/300 may further include a sensor 502. The sensor 502 may sense data in the data recording layer 104 and servo information in the servo layer 102. A slider overcoat layer 504 may be disposed below the recording head 202 and the sensor 502.

The recording system 200/300 may write data on the data recording layer 104 and may write servo information on the servo layer 102 according to the writing processes as described above.

Figure 6:
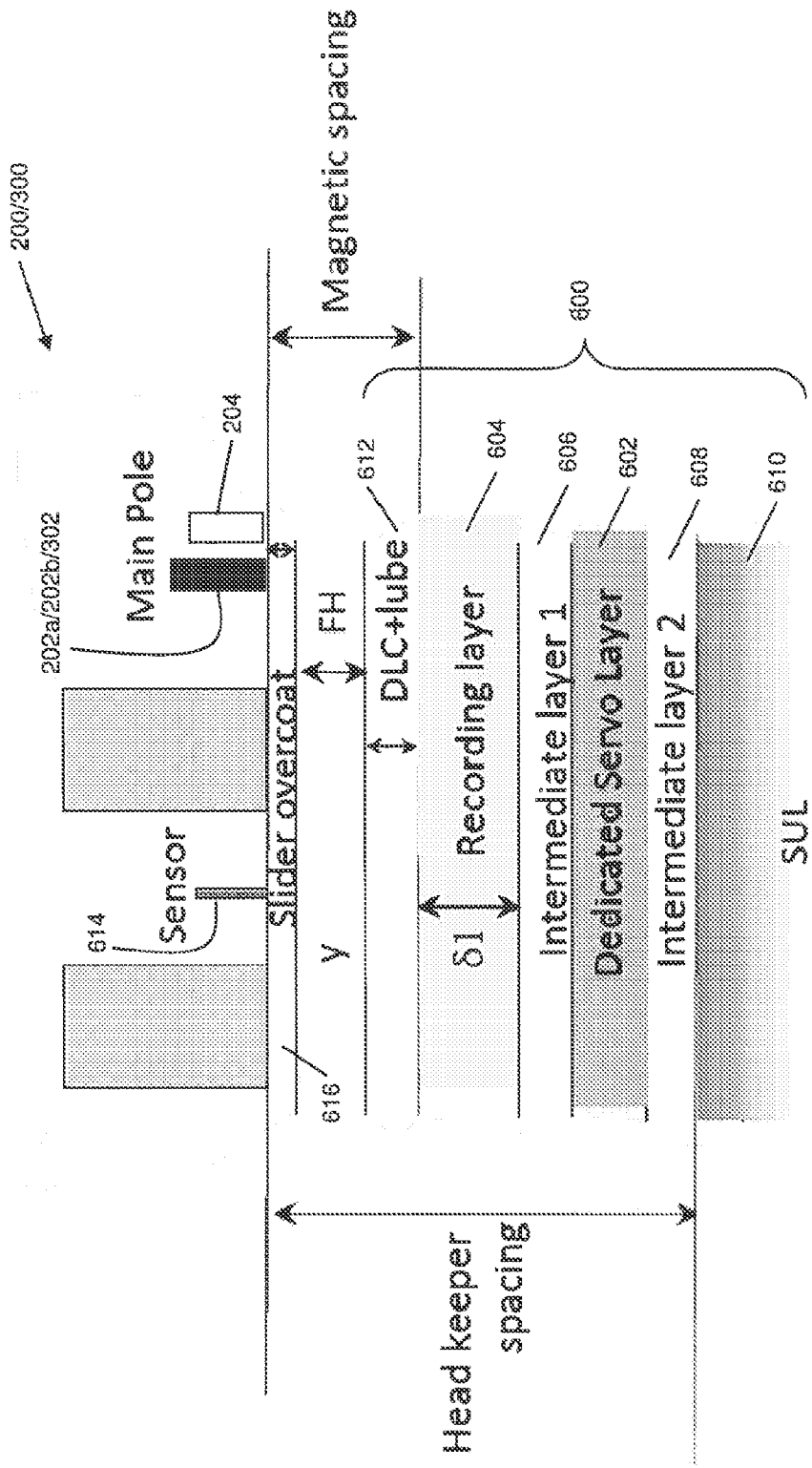
FIG. 6 shows a schematic diagram of a recording system according to one embodiment.

FIG. 6 shows a schematic diagram of the recording system 200/300 used for a medium 600. In one embodiment, the medium 600 includes a servo layer 602, a data recording layer 604, a first intermediate layer 606, a second intermediate layer 608, a soft under-layer (SUL) 610 and a diamond-like carbon (DLC) layer with lubricant coating 612. The second intermediate layer 608 is disposed above the soft under-layer (SUL) 610. The servo layer 602 is disposed above the second intermediate layer 608. The first intermediate layer 606 is disposed above the servo layer 602. The data recording layer 604 is disposed above the first intermediate layer 606. The diamond-like carbon (DLC) layer with lubricant coating 612 is disposed above the data recording layer 604.

The soft under-layer (SUL) 610 may be disposed above a substrate (not shown). The soft under-layer (SUL) 610 can help to enhance the writing ability of the servo layer 602. If a recording/writing head has writing ability for saturation writing of the servo layer 602, a soft under-layer (SUL) 610 may not be required in the medium 600.

In one embodiment, the first intermediate layer 606 and the second intermediate layer 608 can be used for magnetic property control of the data recording layer 604. The first intermediate layer 606 and the second intermediate layer 608 can he used for assisted energy conditioning if an energy assisted magnetic recording scheme is used for writing on the medium 600.

In one embodiment, the recording system 200/300 may further include a sensor 614. The sensor 614 may sense data in the data recording layer 104 and servo information in the servo layer 102. A slider overcoat layer 616 may be disposed below the recording head 202 and the sensor 602.

The recording system 200/300 may write data on the data recording layer 604 and may write servo information on the servo layer 602 according to the writing processes as described above.

Figure 7:
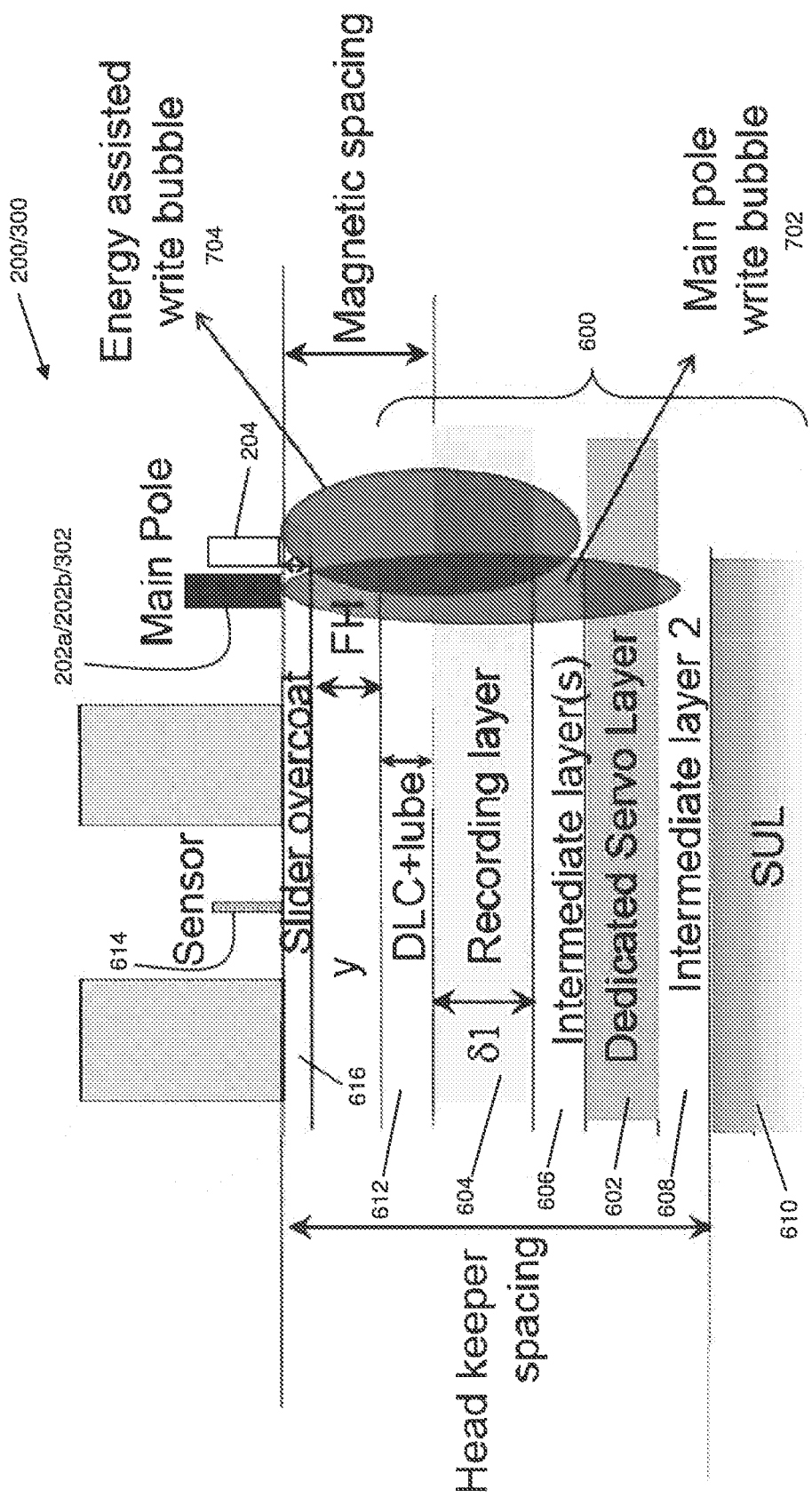
FIG. 7 illustrates a writing process on a data recording layer carried out by a recording head of a recording system according to one embodiment.

FIG. 7 illustrates an exemplary writing process of writing data on the data recording layer 604. FIG. 7 shows a magnetic writing bubble 702 representing a magnetic writing field produced by the first recording head 202a, and an energy assisted writing bubble 704 representing an energy provided by the external energy source 204.

Data writing on the data recording layer 604 may he carried out using an energy assisted magnetic recording scheme, The magnetic writing bubble 702 and the energy assisted writing bubble 704 may overlap to produce an effective writing field (e.g. the first magnetic field of the first magnetic field strength) for data writing on the data recording layer 604.

The strength of both the writing field produced by the first recording head 202a and the energy provided by the external energy source 204 may have large spatial decay. Thus, the first magnetic field of the first magnetic field strength may not have sufficient magnetic field strength to cause servo information to be written on the servo layer 602. The first magnetic field strength may be weaker than a nucleation field strength of the servo layer 602.

Therefore, the first magnetic field of the first magnetic field strength may not affect the magnetic signal in the servo layer 602. The magnetic signals in the servo layer 602 can maintain the magnetic integrity after multiple times of data writing on the data recording layer 604.

Figure 9:
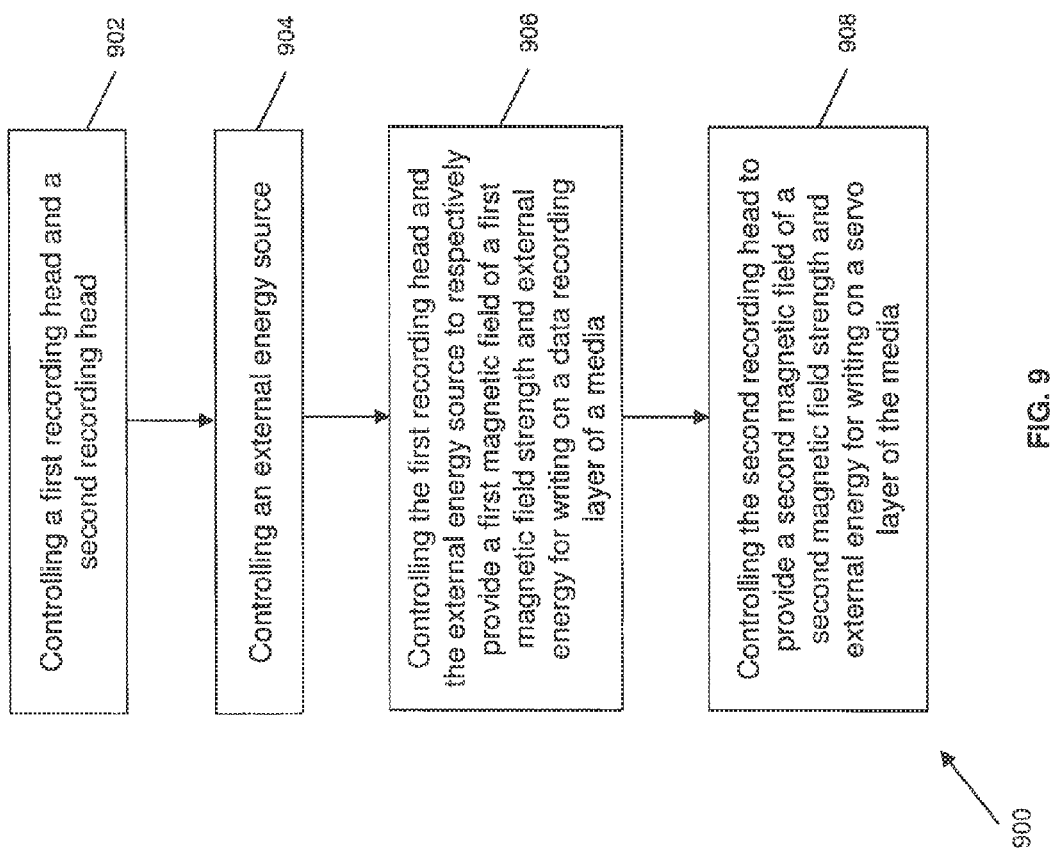
FIG. 9 shows a flowchart of a method of controlling a recording system according to one embodiment.

Further, both the feature sizes of the magnetic writing bubble 702 and the energy assisted writing bubble 704 can be confined to a small size for high density recording to write smaller bits. Therefore, energy assisted magnetic recording can increase areal recording density, FIG. 9 shows a flowchart of a method of controlling a recording system. At 902, a first recording head and a second recording head are controlled. At 904, an external energy source is controlled. At 906, the first recording head and the external energy source are controlled to respectively provide a first magnetic field of a first magnetic field strength and external energy for writing on a data recording layer of a medium. At 908, the second recording head is controlled to provide a second magnetic field of a second magnetic field strength for writing on a servo layer of the medium, The first magnetic field strength may be weaker than the second magnetic field strength, The first magnetic field strength may be weaker than the second magnetic field strength at the servo layer 102.

In one embodiment, the second recording head may be controlled to write servo information on the servo layer using a shingled writing scheme. The second recording head may be controlled to provide the second magnetic field of the second magnetic field strength for writing on the servo layer.

In another embodiment, the second recording head may be controlled to write servo information on the servo layer using an energy assisted magnetic recording scheme. The second recording head and the external energy source are controlled to respectively provide the second magnetic field of the second magnetic field strength and the external energy for writing on the servo layer.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A storage medium comprising:
   a servo layer configured to store servo information on the storage medium, wherein the servo information is used to position a read/write head over the storage medium during a read/write operation performed by the read/write head on the storage medium;
   a data recording layer configured to store data on the storage medium during the read/write operation performed by the read/write head on the storage medium;
   a heat sink layer disposed between the servo layer and the data recording layer;
   a diamond-like carbon layer with a lubricant covering disposed above the data recording layer;
   a thermal isolating layer disposed above the servo layer;
   an intermediate layer; and
   a thermal conditioning layer,
   wherein the intermediate layer, the heat sink layer, and the thermal conditioning layer are disposed between the data recording layer and the thermal isolating layer.

2. The storage medium of claim 1, wherein:
   the intermediate layer is disposed above the thermal isolating layer;
   the heat sink layer is disposed above the intermediate layer; and
   the thermal conditioning layer is disposed above the heat sink layer.

3. The storage medium of claim 1, wherein:
   the heat sink layer is disposed above the thermal isolating layer;
   the intermediate layer is disposed above the heat sink layer; and
   the thermal conditioning layer is disposed above the intermediate layer.

4. The storage medium of claim 1, wherein:
   the heat sink layer is disposed above the thermal isolating layer;
   the thermal conditioning layer is disposed above the heat sink layer; and
   the intermediate layer is disposed above the thermal conditioning layer.

5. The storage medium of claim 1, further comprising:
   a further intermediate layer,
   wherein the servo layer is disposed above the further intermediate layer.

6. The storage medium of claim 5, further comprising:
   a substrate,
   wherein the further intermediate layer is disposed above the substrate.

7. The storage medium of claim 6, further comprising a magnetic soft under-layer disposed between the substrate and the further intermediate layer.

8. A method for fabricating a storage medium, the method comprising:
   disposing a servo layer above a substrate, wherein the servo layer is configured to store servo information on the storage medium, wherein the servo information is used to position a read/write head over the storage medium during a read/write operation performed by the read/write head on the storage medium;
   disposing a heat sink layer above the servo layer;
   disposing a data recording layer above the heat sink layer, wherein the data recording layer is configured to store data on the storage medium during the read/write operation performed by the read/write head on the storage medium;
   disposing a diamond-like carbon layer with a lubricant covering above the data recording layer;
   disposing a thermal isolating layer above the servo layer; and
   disposing an intermediate layer, the heat sink layer, and a thermal conditioning layer between the data recording layer and the thermal isolating layer.

9. The method of claim 8, further comprising:
   disposing the intermediate layer above the thermal isolating layer;
   disposing the heat sink layer above the intermediate layer; and
   disposing the thermal conditioning layer above the heat sink layer.

10. The method of claim 8, wherein:
    disposing the heat sink layer above the thermal isolating layer;
    disposing the intermediate layer above the heat sink layer; and
    disposing the thermal conditioning layer above the intermediate layer.

11. The method of claim 8, wherein:
    disposing the heat sink layer above the thermal isolating layer;
    disposing the thermal conditioning layer above the heat sink layer; and
    disposing the intermediate layer above the thermal conditioning layer.

12. The method of claim 8, further comprising disposing a further intermediate layer above the substrate and below the servo layer.

13. The method of claim 12, further comprising disposing a magnetic soft under-layer between the substrate and the further intermediate layer.

* * * * *